US012056783B2

(12) United States Patent
Smith et al.

(10) Patent No.: US 12,056,783 B2
(45) Date of Patent: *Aug. 6, 2024

(54) SYSTEMS AND METHODS FOR PROCESSING RECORDED DATA FOR STORAGE USING COMPUTER-AIDED DISPATCH INFORMATION

(71) Applicant: Axon Enterprise, Inc., Scottsdale, AZ (US)

(72) Inventors: Patrick W. Smith, Scottsdale, AZ (US); Mark A. Hanchett, Mesa, AZ (US); Aaron J. Kloc, Scottsdale, AZ (US); Tyler J. Conant, Seattle, WA (US)

(73) Assignee: Axon Enterprise, Inc., Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/139,287

(22) Filed: Apr. 25, 2023

(65) Prior Publication Data
US 2023/0260070 A1    Aug. 17, 2023

Related U.S. Application Data

(63) Continuation of application No. 17/403,848, filed on Aug. 16, 2021, now Pat. No. 11,636,562, which is a
(Continued)

(51) Int. Cl.
*G06F 16/71* (2019.01)
*G06F 1/16* (2006.01)
(Continued)

(52) U.S. Cl.
CPC ........... *G06Q 50/265* (2013.01); *G06F 1/163* (2013.01); *G06F 16/2365* (2019.01);
(Continued)

(58) Field of Classification Search
CPC ... G06Q 50/265; G06F 1/163; G06F 16/2365; G06F 16/61; G06F 16/71; G06V 20/10; G06V 20/13; H04N 5/77; H04N 9/802
See application file for complete search history.

(56) References Cited

U.S. PATENT DOCUMENTS

RE38,626 E    10/2004  Kielland
7,519,271 B2   4/2009  Strub et al.
(Continued)

FOREIGN PATENT DOCUMENTS

EP    2109074 A1    10/2009
EP    2587829 A1    5/2013
(Continued)

OTHER PUBLICATIONS

European Patent Office, Communication under Rule 71(3) EPC for European Application No. 16825204.7-1202 mailed Sep. 13, 2022.
(Continued)

*Primary Examiner* — Shahbaz Nazrul
(74) *Attorney, Agent, or Firm* — Andrew Graham

(57) ABSTRACT

Computer-implemented methods and systems for processing recorded data for storage is provided. An auditable device, such as a digital video camera, stores a set of recorded data. The auditable device also stores auditable event entries that represent auditable events detected by the auditable device. One type of auditable event is the receipt of information from a computer-aided dispatch (CAD) system that indicates an event. The auditable device marks at least one subset of the set of recorded data based on the auditable event entries, and uploads the marked at least one subset of the set of recorded data to an evidence management system.

20 Claims, 9 Drawing Sheets

Related U.S. Application Data continuation of application No. 16/563,810, filed on Sep. 6, 2019, now Pat. No. 11,094,025, which is a continuation of application No. 15/210,060, filed on Jul. 14, 2016, now Pat. No. 10,430,907, which is a continuation-in-part of application No. 15/048,218, filed on Feb. 19, 2016, now Pat. No. 10,192,277.

(60) Provisional application No. 62/192,466, filed on Jul. 14, 2015.

(51) Int. Cl.
  *G06F 16/23* (2019.01)
  *G06F 16/61* (2019.01)
  *G06Q 50/26* (2012.01)
  *G06V 20/10* (2022.01)
  *G06V 20/13* (2022.01)
  *H04N 5/77* (2006.01)
  *H04N 9/802* (2006.01)

(52) U.S. Cl.
  CPC ............. *G06F 16/61* (2019.01); *G06F 16/71* (2019.01); *G06V 20/10* (2022.01); *G06V 20/13* (2022.01); *H04N 5/77* (2013.01); *H04N 9/802* (2013.01)

(56) References Cited

U.S. PATENT DOCUMENTS

| | | |
|---|---|---|
| 7,685,428 B2 | 3/2010 | Piersol |
| 8,350,907 B1 | 1/2013 | Blanco et al. |
| 8,351,447 B2 | 1/2013 | Habuto et al. |
| 8,964,014 B2 | 2/2015 | Ollila et al. |
| 9,041,803 B2 | 5/2015 | Chen et al. |
| 9,237,262 B2 | 1/2016 | Phillips et al. |
| 2004/0008255 A1 | 1/2004 | Lewellen |
| 2005/0078672 A1 | 4/2005 | Caliskan et al. |
| 2009/0189981 A1 | 7/2009 | Siann |
| 2009/0307557 A1 | 12/2009 | Rao et al. |
| 2011/0298736 A1 | 12/2011 | Madonna et al. |
| 2013/0302018 A1 | 11/2013 | Jiang et al. |
| 2014/0157344 A1 | 6/2014 | Tine et al. |
| 2014/0167954 A1 | 6/2014 | Johnson et al. |
| 2014/0186004 A1 | 7/2014 | Hamer |
| 2014/0215885 A1 | 8/2014 | Sullivan et al. |
| 2014/0368601 A1* | 12/2014 | deCharms ............. H04N 7/148 348/14.02 |
| 2015/0086175 A1 | 3/2015 | Lorenzetti |
| 2015/0097671 A1 | 4/2015 | Laflen et al. |
| 2015/0103246 A1 | 4/2015 | Phillips |
| 2015/0172538 A1 | 6/2015 | Nordstrom |
| 2015/0206419 A1 | 7/2015 | Johnson et al. |
| 2016/0042621 A1 | 2/2016 | Hogg et al. |
| 2016/0042767 A1 | 2/2016 | Araya |
| 2016/0227173 A1 | 8/2016 | Yamaguchi |
| 2017/0041359 A1 | 2/2017 | Kwan |
| 2017/0059265 A1 | 3/2017 | Winter |
| 2017/0061200 A1 | 3/2017 | Wexler |
| 2017/0133051 A1 | 5/2017 | Mack |
| 2017/0230605 A1 | 8/2017 | Han |
| 2017/0284754 A1 | 10/2017 | Chakraborty |
| 2018/0050800 A1 | 2/2018 | Boykin |
| 2018/0063421 A1 | 3/2018 | Yokomitsu |
| 2018/0101194 A1 | 4/2018 | Wakako |
| 2018/0249087 A1 | 8/2018 | Arnold |
| 2018/0376111 A1 | 12/2018 | Mrowiec |
| 2019/0003804 A1 | 1/2019 | Deng |

FOREIGN PATENT DOCUMENTS

| | | |
|---|---|---|
| TW | 201525885 A1 | 7/2015 |
| WO | 2010069048 A1 | 6/2010 |
| WO | 2014018155 A1 | 1/2014 |
| WO | 2016014724 A1 | 1/2016 |

OTHER PUBLICATIONS

Korean Intellectual Property Office, International Search Report for International Application No. PCT/US16/42339 mailed Oct. 26, 2016.

Taiwan Intellectual Property Office, Search Report for Taiwanese Application No. 105122248 mailed May 9, 2017.

European Patent Office, Extended European Search Report for European Application No. 16825204.7 mailed Dec. 3, 2018.

European Patent Office, Communication under Rule 71(3) EPC for European Application No. 16825204.7-1201 mailed Mar. 25, 2022.

* cited by examiner

SYSTEMS AND METHODS FOR PROCESSING RECORDED DATA FOR STORAGE USING COMPUTER-AIDED DISPATCH INFORMATION

CROSS-REFERENCES TO RELATED APPLICATIONS

This application is a continuation of U.S. application Ser. No. 17/403,848, filed Aug. 16, 2021, which a continuation of U.S. application Ser. No. 16/563,810, filed Sep. 6, 2019, now U.S. Pat. No. 11,094,025, which is a continuation of U.S. application Ser. No. 15/210,060, filed Jul. 14, 2016, now U.S. Pat. No. 10,430,907, which is a continuation-in-part of U.S. application Ser. No. 15/048,218, filed Feb. 19, 2016, now U.S. Pat. No. 10,192,277, which claims the benefit of U.S. Provisional Application No. 62/192,466, filed Jul. 14, 2015, the entire disclosures of which are hereby incorporated by reference herein in their entirety.

BACKGROUND

Existing systems for collecting digital video data from wearable cameras have a plethora of technical shortcomings, especially when used in a law enforcement context. Wearable cameras for law enforcement require long battery life to last through an entire shift. However, it is also desirable to monitor the activities performed with such cameras in order to ensure that a chain of custody of any videos recorded by the cameras can be provably established, and to ensure that any videos recorded by the cameras are eventually uploaded to an evidence management system for storage. Because the cameras require minimal power consumption and have only intermittent connectivity to an evidence management system (if any at all), technical hurdles exist in collecting data from wearable cameras in a way that can provide reliable chain-of-custody information and preserve battery life at the same time.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a computer-implemented method of processing recorded data for storage is provided. An auditable device stores a set of recorded data within a data store of the auditable device The auditable device receives information from a computer-aided dispatch system indicating at least one event, wherein the at least one event includes an event start time and an event stop time. The auditable device marks at least one subset of the set of recorded data based on the at least one event received from the computer-aided dispatch system. The auditable device uploads the marked at least one subset of the set of recorded data to an evidence management system, wherein the marked at least one subset of the set of recorded data is less than all of the set of recorded data.

In some embodiments, an auditable camera is provided. The auditable camera includes a video sensor, a video data store, an audit trail data store, and an audit trail gathering engine. The video data store is configured to store video data generated by the video sensor. The audit trail data store is configured to store a set of auditable event entries. The audit trail gathering engine is configured to, in response to receiving a notification of an event reported by a component of the auditable camera, record an auditable event entry representing the event in the audit trail data store. The auditable camera is configured to transmit a subset of the video data stored in the video data store to an evidence management server, wherein the subset of the video data is selected based on the auditable event entry.

In some embodiments, a non-transitory computer-readable medium having computer-executable instructions stored thereon is provided. The instructions, in response to execution by one or more processors of an auditable device, cause the auditable device to perform actions for processing recorded data for storage that comprise storing a set of recorded data within a data store of the auditable device; receiving information from a computer-aided dispatch system indicating at least one event, wherein the at least one event includes an event start time and an event stop time; marking at least one subset of the set of recorded data based on the at least one event received from the computer-aided dispatch system; and uploading the marked at least one subset of the set of recorded data to an evidence management system, wherein the marked at least one subset of the set of recorded data is less than all of the set of recorded data.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Embodiments of the present disclosure solve the technical problems introduced above, as well as others. In some embodiments, auditable devices such as auditable cameras are provided. The auditable devices maintain audit trail data that is digitally signed and stored on the devices until it can be uploaded to an evidence management system. When an intermittent data connection to the evidence management system is available, the auditable devices transmit records of urgent events to the evidence management system, so that the evidence management system is notified to expect further data associated with the events despite the lack of persistent data connectivity to the device. By using these and other techniques, the technical problems introduced above and others can be overcome.

Figure 1:
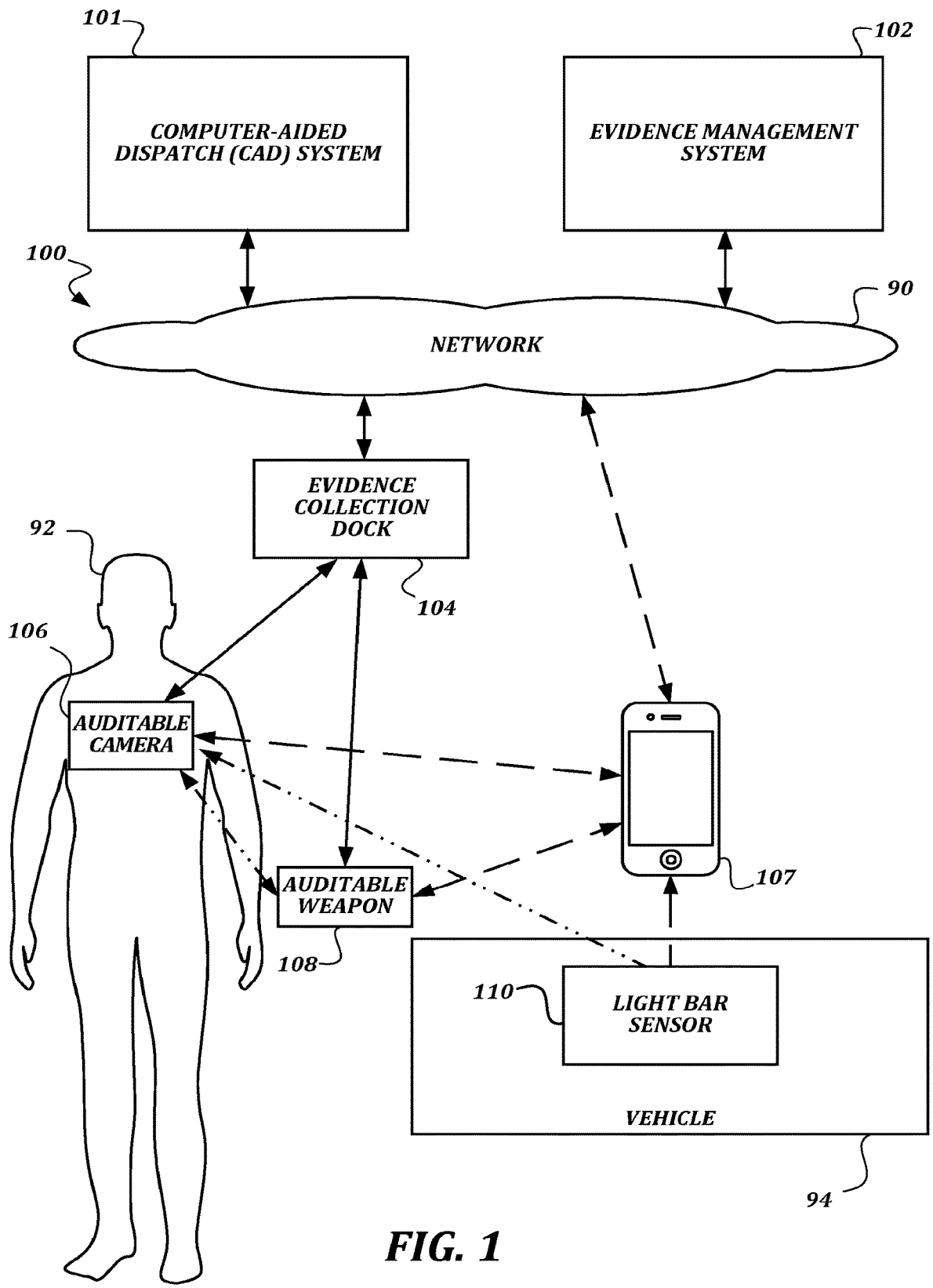
FIG. 1 is a high-level schematic diagram that illustrates communication between various components of an exemplary embodiment of a system according to various aspects of the present disclosure.

FIG. 1 is a high-level schematic diagram that illustrates communication between various components of an exemplary embodiment of a system according to various aspects of the present disclosure. In some embodiments, the system 100 is configured to allow for collection of auditing information from a plurality of auditable devices. The auditing information is generated by the auditable devices while they are being operated, and is gathered by an evidence management system 102.

In general, a user 92, such as a law enforcement officer, may carry one or more auditable devices. The devices may include, but are not limited to, an auditable camera 106, an auditable weapon 108, and a light bar sensor 110. The auditable camera 106 may be, for example, a wearable camera that records video and/or audio data when activated, and stores a record of auditable events that occur (such as the start of recording, the end of recording, various device faults, and/or the like and as described further below). The auditable weapon 108 may be, for example, a conducted energy weapon (CEW) that records firing events, cartridge loading, holster removal, and/or the like. The light bar sensor 110 may detect activation of the light bar on the vehicle 94, which is usually associated with an emergency situation. Other auditable devices, such as a dashboard camera, a heart rate sensor, may also be included in the system 100 but are not illustrated in FIG. 1.

In some embodiments, the auditable devices may have limited communication functionality. For example, auditable devices may only be able to transmit information to the evidence management system 102 when physically connected to an evidence collection dock 104 that communicates with the evidence management system 102 via a broadband network 90 such as a LAN, a WAN, and/or the Internet. Accordingly, technical problems arise when attempting to obtain verifiably complete auditing information in that there is no reliable, always-on communication path between the evidence management system 102 and the auditable devices.

In some embodiments, an ad-hoc communication path may be created between the auditable device and the evidence management system 102 via a coordinator computing device 107. The coordinator computing device 107 is illustrated as a smartphone computing device, but in some embodiments may be a laptop computing device, a tablet computing device, or any other suitable computing device capable of being carried by the user 92 or a vehicle 94 associated with the user 92 and capable of performing the actions described herein. The coordinator computing device 107 communicates with the auditable devices, and may also communicate with other devices such as a light bar sensor 110 of a vehicle 94 associated with the user 92, using a short-range wireless communication technology such as Bluetooth, Bluetooth low energy, Zigbee, IrDA, ANT, ANT+, 802.15.4, near-field communication (NFC), a radio frequency identifier (RFID) tag, and/or the like. In some embodiments, the auditable camera 106 may receive data directly from other auditable devices such as an auditable weapon 108 or a light bar sensor 110 in order to enhance the auditable event entries collected by the auditable camera 106.

The coordinator computing device 107 is capable of communicating with the evidence management system 102, though the communication path between the coordinator computing device 107 may be unreliable, may drain battery performance too greatly to be constantly enabled, or may be of relatively low bandwidth. As such, the communication of information from the coordinator computing device 107 to the evidence management system 102 may be sporadic and may transmit only a subset of information gathered by or audited on the auditable devices. Though a single coordinator computing device 107 is illustrated, in some embodiments more than one coordinator computing device 107 may be associated with a vehicle 94. For example, a smartphone carried by the user 92 may be a first coordinator computing device 107, and a mobile data terminal (MDT) or mobile digital computer (MDC) mounted in the vehicle 94 may be a second coordinator computing device 107.

In some embodiments, auditable devices (such as the auditable camera 106 and the auditable weapon 108) and/or coordinator computing devices 107 may also communicate with a computer-aided dispatch (CAD) system 101. The CAD system 101 may communicate with the auditable devices and/or coordinator computing devices 107 using any suitable technique, including but not limited to internet data communication over 3G, 4G, LTE, or a similar long-range wireless protocol; short message service (SMS) messages, selective calling, or any other suitable technique. The CAD system 101 may communicate directly with the auditable devices or may communicate with the auditable devices via the coordinator computing device 107.

Further aspects of these devices and their capabilities will be discussed below.

Figure 2:
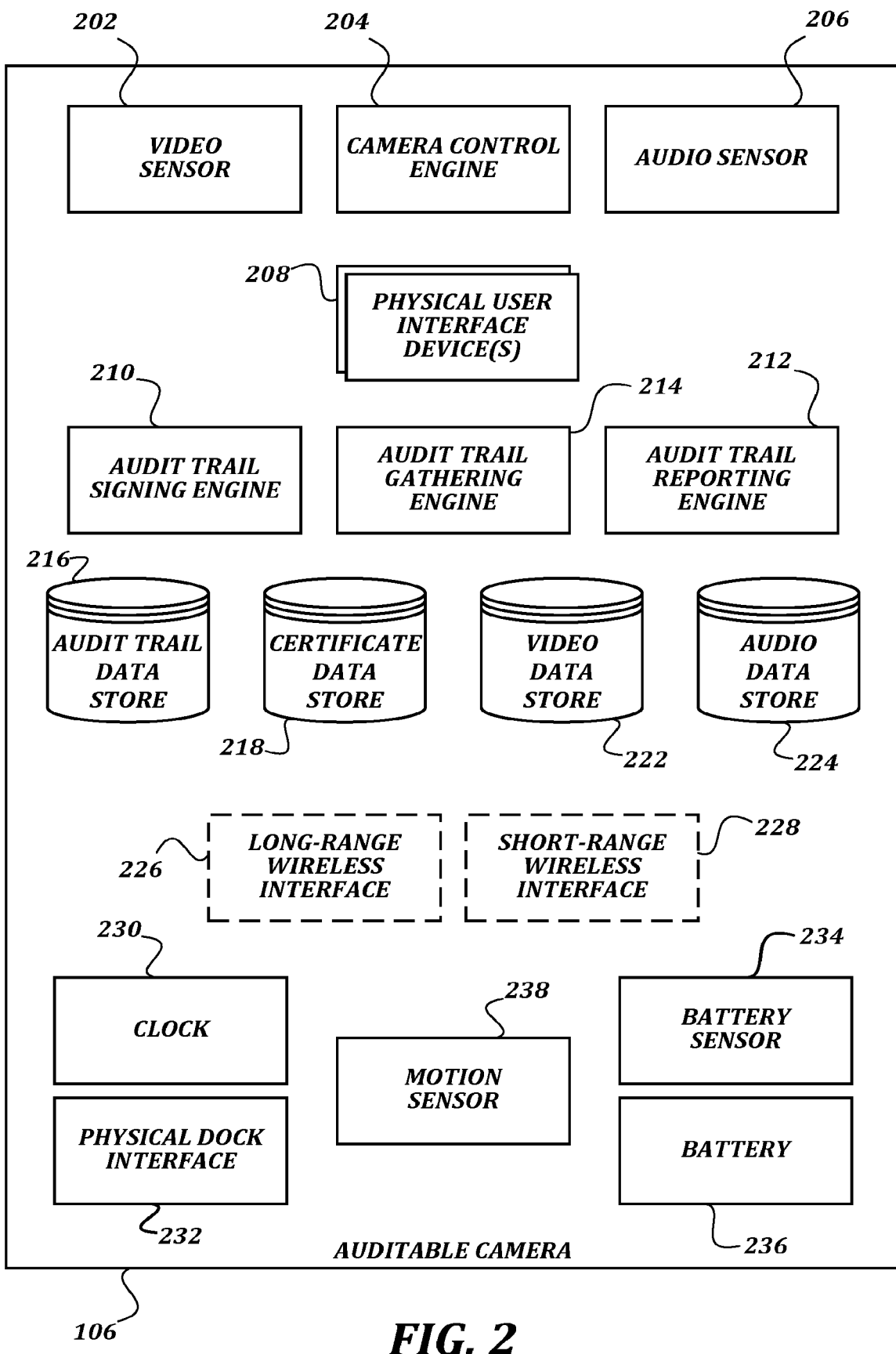
FIG. 2 is a block diagram that illustrates components of an exemplary embodiment of an auditable camera according to various aspects of the present disclosure.

FIG. 2 is a block diagram that illustrates components of an exemplary embodiment of an auditable camera according to various aspects of the present disclosure. In some embodiments, the auditable camera 106 is a wearable camera that provides a point of view associated with the user 92. In some embodiments, the auditable camera 106 may be attached to another device carried by the user 92, such as a weapon.

As with any camera, the auditable camera 106 includes at least a video sensor 202, and may also include an audio sensor 206. Data collected by the video sensor 202 and the audio sensor 206 may be stored in a video data store 222 and an audio data store 224, respectively, though in some embodiments the audio and video information is stored together in a single data store and/or in a combined data file. One example of an appropriate video sensor is a charge-coupled device (CCD), though any other digital image sensor, such as a complementary metal-oxide-semiconductor (CMOS) sensor, an active pixel sensor, or any other type of digital image sensor could be used instead. Any type of microphone may be used as an audio sensor 206.

As understood by one of ordinary skill in the art, a "data store" as described herein may be any suitable device configured to store data for access by a computing device. One example of a data store suitable for use with the high capacity needs of the evidence management system 102 is a highly reliable, high-speed relational database management system (RDBMS) executing on one or more computing devices and accessible over a high-speed network. However, any other suitable storage technique and/or device capable of quickly and reliably providing the stored data in response to queries may be used, such as a key-value store, an object database, and/or the like. Further, for the evidence management system 102, the computing device providing the data store may be accessible locally instead of over a network, or may be provided as a cloud-based service. A data store may also include data stored in an organized manner on a computer-readable storage medium, as described further below. One example of a data store suitable for use with the needs of the auditable camera 106 and the coordinator computing device 107, which includes reliable storage but also low overhead, is a file system or database management system that stores data in files (or records) on a computer readable medium such as flash memory, random access memory (RAM), hard disk drives, and/or the like. One of ordinary skill in the art will recognize that separate data stores described herein may be combined into a single data store, and/or a single data store described herein may be separated into multiple data stores, without departing from the scope of the present disclosure.

The auditable camera 106 includes a set of engines, including a camera control engine 204, an audit trail signing engine 210, an audit trail gathering engine 214, and an audit trail reporting engine 212. In general, the term "engine" as used herein refers to logic embodied in hardware or software instructions, which can be written in a programming language, such as C, C++, COBOL, JAVA™, PHP, Perl, HTML, CSS, JavaScript, VBScript, ASPX, Microsoft-.NET™ languages such as C #, and/or the like. An engine may be compiled into executable programs or written in interpreted programming languages. Engines may be callable from other engines or from themselves. Generally, the engines described herein refer to logical modules that can be merged with other engines or applications, or can be divided into sub-engines. The engines can be stored in any type of computer readable medium or computer storage device and be stored on and executed by one or more general purpose computers, thus creating a special purpose computer configured to provide the engine. Accordingly, the devices and systems illustrated herein include one or more computing devices configured to provide the illustrated engines, though the computing devices themselves have not been illustrated in every case for the sake of clarity.

The camera control engine 204 is configured to cause the auditable camera 106 to perform camera functions. For example, the camera control engine 204 may cause the video sensor 202 and audio sensor 206 to begin obtaining data, and may save the video and/or audio data in a video data store 222 and/or audio data store 224 after receiving it from the sensor. The camera control engine 204 may receive commands to start, pause, or stop the video recording from a physical user interface device 208, or may automatically start, pause, or stop the video recording in response to a signal received from some other component of the auditable camera 106 (such as the battery sensor 234, the clock 230, the motion sensor 238, the short-range wireless interface 228, and/or the like). The camera control engine 204 may also change settings on the video sensor 202 and/or audio sensor 206, such as an image quality, a white balance setting, a gain, and/or any other common video or audio recording setting, based on configuration settings received via a physical user interface device 208, via the short-range wireless interface 228, via the physical dock interface 232, or by any other suitable technique. Any type of physical user interface device 208 that can transmit commands to the camera control engine 204 may be used, including but not limited to push button switches, toggle switches, slide switches, touch switches, and/or the like.

In some embodiments, the camera control engine 204 may report starting, pausing, or stopping the video recording, as well as the settings for the video sensor 202 and audio sensor 206, as auditable events to the audit trail gathering engine 214. In some embodiments, the camera control engine 204 may embed the sensor configuration information in the data stored in the video data store 222 and/or audio data store 224, along with other information about the state of the auditable camera 106 or other information received via the short-range wireless interface about other auditable devices, to prevent the additional information from being disassociated with the video and/or audio data.

The auditable camera 106 also includes an audit trail data store 216 for storing records of auditable events and a certificate data store 218 for storing data usable for digital signing. The audit trail gathering engine 214 is configured to receive reports of auditable events from the other components of the auditable camera 106, and to record auditable event records that represent the events in the audit trail data store 216. The audit trail signing engine 210 is configured to use one or more signing certificates from the certificate data store 218 to apply a digital signature to the auditable event records in the audit trail data store 216. The audit trail reporting engine 212 is configured to transmit the audit trail information from the audit trail data store 216 to the evidence management system 102, either directly via the long-range wireless interface 226 or physical dock interface 232, or via the short-range wireless interface 228 and the coordinator computing device 107. Further details of the functionality of these components are provided below.

The auditable camera 106 also includes a number of general components, including a clock 230, a motion sensor 238, a physical dock interface 232, a battery sensor 234, a battery 236. The clock 230 may be used by the audit trail gathering engine 214, the audit trail reporting engine 212, the camera control engine 204, or any other component of the auditable camera 106 to include timestamp information in generated data. The motion sensor 238, such as a multi-axis accelerometer, also produces information that may be used by other components. For example, the audit trail gathering engine 214 may use the motion sensor 238 to detect a certain type of motion, such as running, falling, and/or the like, and to treat the detected motion as an auditable event.

The physical dock interface 232 is configured to mate with a physical connector on the evidence collection dock 104. In some embodiments, the physical dock interface 232 may include a female 2.5 mm socket, which mates with a male 2.5 mm plug of the evidence collection dock 104. Once docked, the auditable camera 106 may then transfer data to the evidence management system 102 via the connection using any suitable data transmission protocol. In some embodiments, power may be transferred to the auditable camera 106 via the physical dock interface 232 instead of or in addition to the data transfer. In some embodiments, other connection hardware that can provide both power and data connectivity may be used, such as a USB connector, a Firewire connector, and/or the like.

The battery sensor 234 and the battery 236 are an example of an internal system that may generate auditable events that are captured by the audit trail gathering engine 214 without user intervention. For example, the battery sensor 234 may detect a low battery state, a battery overheating state, and/or the like, and may generate alerts to be logged as auditable events by the audit trail gathering engine. Other well-known internal device systems, such as a file system controller, a free-fall sensor, and/or the like, may similarly generate alerts to be logged as auditable events, but are not illustrated here.

The auditable camera 106 also includes an optional long-range wireless interface 226 and an optional short-range wireless interface 228. The long-range wireless interface 226 may use any suitable networking technology capable of establishing a wireless data connection to the evidence management system 102 (or other computing devices accessible via the network 90, such as the computer-aided dispatch system 402 or the records management system 404) from the auditable camera 106 from any geographical area, including but not limited to 3G, 4G, LTE, and/or the like. The short-range wireless interface 228 may use any suitable wireless networking technology capable of establishing a wireless data connection to the coordinator computing device 107 when within range of the coordinator computing device 107, including but not limited to Bluetooth, Bluetooth low energy, ZigBee, NFC, and/or the like. These wireless interfaces are illustrated as optional, because some embodiments may be missing one or both interfaces. For example, in some embodiments, the only communication performed by the auditable camera 106 may be through the physical dock interface 232. As another example, in some embodiments only the short-range wireless interface 228 may be present, and so the auditable camera 106 may only be able to communicate with the evidence management system 102 via the physical dock interface 232 or via the short-range wireless interface 228 through the coordinator computing device 107.

In some embodiments, actions by the auditable camera 106 trigger action reporting to one or more computing devices besides the evidence management system 102. In one example, where the user 92 is a responder (e.g., police officer), actions by the auditable camera 106 trigger reporting action reporting to a computing device associated with a supervisor of the user 92 and/or a computing device associated with another responder associated with the user 92 (e.g., a partner of user 92). Actions that may trigger action reporting include starting, pausing, or stopping video recording. Other actions that may trigger action reporting may include the manner in which actions by the auditable camera 106, such as manually starting video recording by the user 92, automatic starting video recording by a remote computing device (e.g., a dispatch computing device), and the like.

When action reporting is triggered, the auditable camera 106 sends a signal to the one or more computing devices. The signal sent from auditable camera 106 can be sent via the network 90 to the one or more computing devices, via the coordinator computing device 107 and the network 90 to the one or more computing devices, via the evidence collection dock 104 and the network 90 to the one or more computing devices, or to the one or more computing devices via any other communication path. The signal may be in the form a text message, an email message, a signal that causes an audible or visual alert, and the like.

Action reporting may be used as an alert to other users associated with the user 92. In one example, the user 92 is a responder and the auditable camera 106 is configured to send an action report to a computing device of a supervisor of the user 92 in response to the auditable camera 106 pausing video recording. This allows the supervisor to know that a recording was paused and possibly investigate why the recording was paused. In this example, the auditable camera 106 may not be configured to send an action report to the computing device of the supervisor in response to the auditable camera 106 starting or stopping video recording as such starting or stopping video recording may occur too frequently for the supervisor to want alerts. In another example, the user 92 is a responder and the auditable camera 106 is configured to send an action report to a computing device of another responder associated with the user 92 in response to a video recording of the auditable camera 106 being manually started. Manual starting of the video recording may indicate that a situation of interest is occurring around the user 92 and action reporting in response to manual starting may be an alert to the other responder to be aware of the situation.

Though FIG. 2 illustrates components of a camera, one of ordinary skill in the art will recognize that, other than the components that make the device a camera such as the video sensor 202, audio sensor 206, and the associated data stores, similar components may be included in an auditable weapon 108 or an auditable device of some other type.

Figure 3:
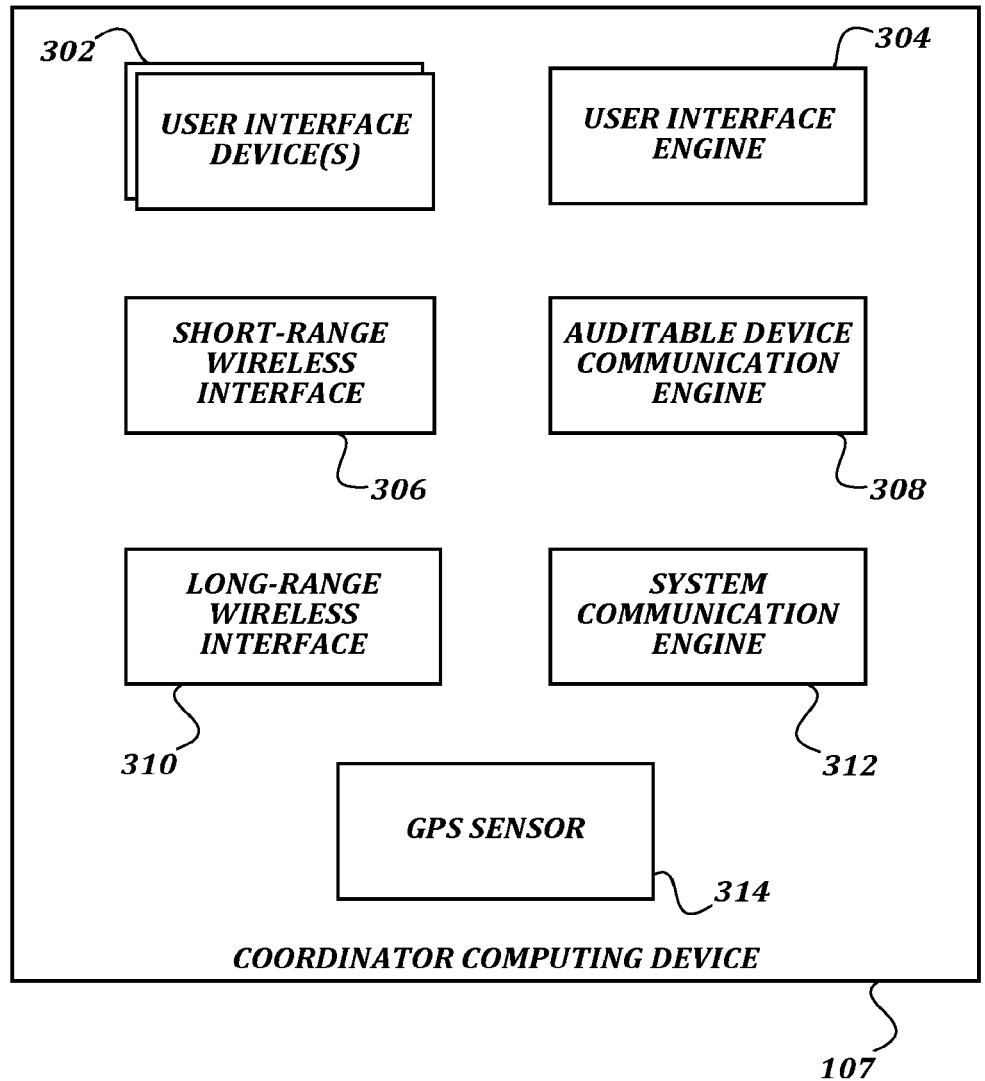
FIG. 3 is a block diagram that illustrates an exemplary embodiment of a coordinator computing device according to various aspects of the present disclosure.

FIG. 3 is a block diagram that illustrates an exemplary embodiment of a coordinator computing device according to various aspects of the present disclosure. As illustrated, the coordinator computing device 107, which as stated above may be a smart phone or any other suitable computing device, includes a short-range wireless interface 306, a long-range wireless interface 310, and a GPS sensor 314. The short-range wireless interface 306 is configured to allow the components of the coordinator computing device 107 to communicate with the other nearby components of the system 100 when they are within range, including auditable devices such as the auditable camera 106 and the auditable weapon 108 and the light bar sensor 110 of the vehicle 94. The short-range wireless interface 306 may use one or more short-range wireless networking technologies such as those discussed above with respect to the auditable camera 106 in order to provide these communication paths. The long-range wireless interface 310 is configured to allow the coordinator computing device 107 to communicate data with the evidence management system 102 as long as the coordinator computing device 107 is within a service area of a corresponding long-range wireless data service, such as 3G, 4G, LTE, and/or the like. The GPS sensor 314 is configured to obtain a geographic position of the coordinator computing device 107 using satellite signals, triangulation of cellular phone towers, or any other technique known to one of ordinary skill in the art.

The coordinator computing device 107 also includes one or more user interface devices 302, a user interface engine 304, an auditable device communication engine 308, and a system communication engine 312. The one or more user interface devices 302 may include, but are not limited to, physical buttons, status lights, a display, a touch-screen display, a loudspeaker, and/or the like. The user interface engine 304 is configured to present an interactive interface to the user 92 and receive input from the user 92 via the user interface devices 302. The interactive interface may allow the user 92 to control the auditable devices, add information to auditable events, generate auditable events, manually initiate an upload of urgent auditable events to the evidence management system 102, and/or take other actions within the system 100. The auditable device communication engine 308 manages communication with the auditable devices via the short-range wireless interface 306, and the system communication engine 312 manages communication with the evidence management system 102. Further details of the functionality of the components of the coordinator computing device 107 are provided below.

Figure 4:
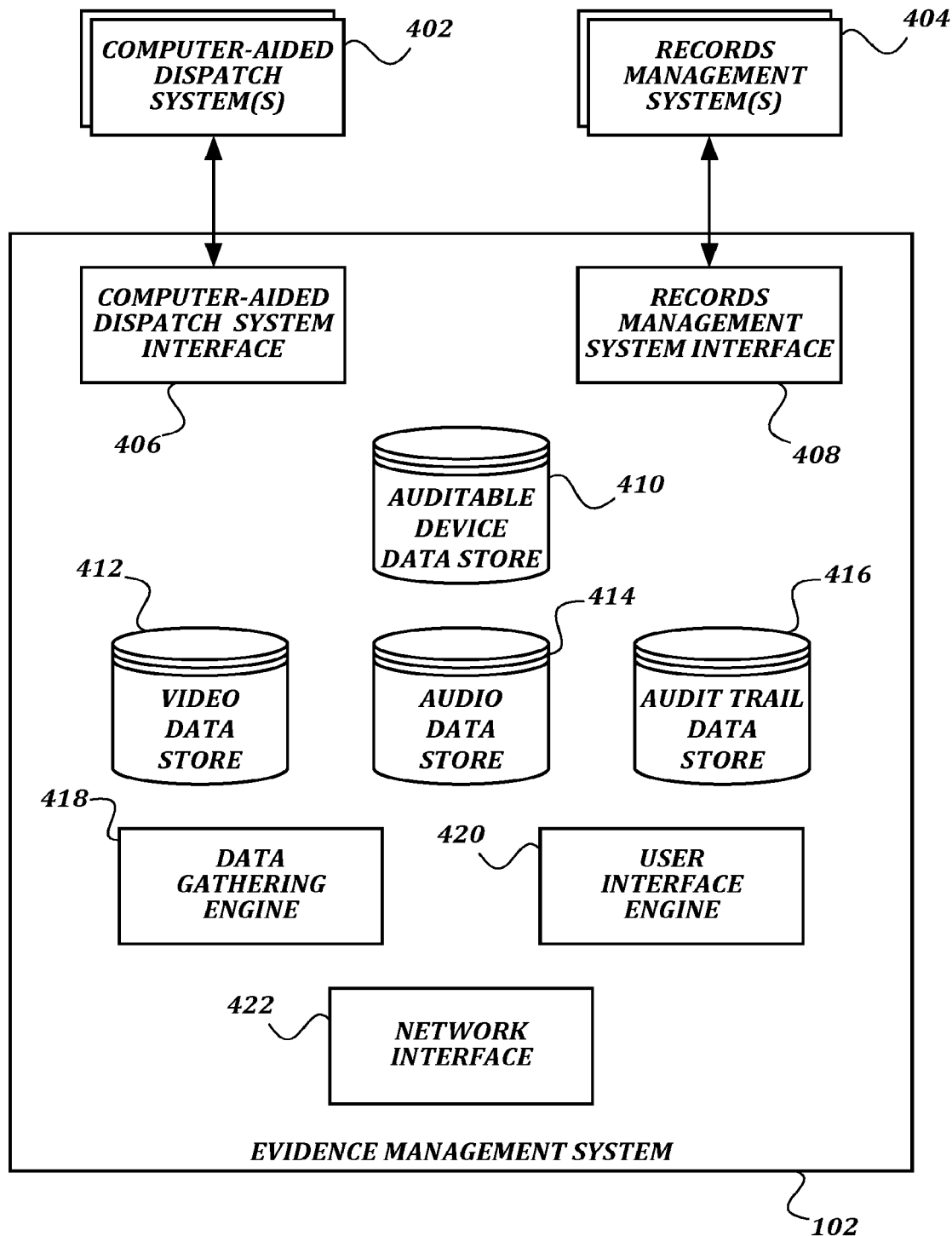
FIG. 4 is a block diagram that illustrates an exemplary embodiment of an evidence management system according to various aspects of the present disclosure.

FIG. 4 is a block diagram that illustrates an exemplary embodiment of an evidence management system according to various aspects of the present disclosure. In some embodiments, the evidence management system 102 comprises a plurality of computing devices configured to provide the illustrated components, though they are described as a single system for clarity. One of ordinary skill in the art will recognize that any suitable server system, such as a single server, a server farm, a cloud service, and/or the like, may be used to provide the functionality of the evidence management system 102.

As illustrated, the evidence management system 102 includes a computer-aided dispatch system interface 406, a records management system interface 408, and a network interface 422. The computer-aided dispatch system interface 406 enables the evidence management system 102 to communicate with one or more computer-aided dispatch (CAD) systems 402 operated by other parties. This communication allows the evidence management system 102 to automatically import information from the CAD systems 402, such as incident codes, user 92 or vehicle 94 locations at given times, event start and/or stop information, and/or the like. This information may then be correlated with or otherwise used to enhance information received from auditable devices. For example, the event start and/or stop information could be used by the evidence management system 102 to determine which portions of a larger set of recorded data are important and should be retrieved and saved in a data store of the evidence management system 102. Such examples are discussed further below. In some embodiments, the evidence management system 102 may retrieve information from the CAD system 402 and transmit it to one or more auditable devices.

The records management system interface 408 enables the evidence management system 102 to communicate with one or more records management systems 404 operated by other parties. This communication likewise allows the evidence management system 102 to automatically import information such as case numbers and/or the like. The records management system interface 408 may also provide information from the evidence management system 102 back to the records management systems 404, including but not limited to links to data stored in the video data store 412, the audio data store 414, and/or the audit trail data store 416; copies of audit trail information stored in the audit trail data store 416; and/or the like. As with the connections to the CAD system(s) 402, information from the records management system 404 could be used to indicate which portions of a larger set of recorded are to be retrieved and saved in a data store of the evidence management system 102, and information from the records management system 404 could be transmitted by the evidence management system 102 to one or more auditable devices.

The evidence management system 102 also includes an auditable device data store 410, a video data store 412, an audio data store 414, and an audit trail data store 416. The auditable device data store 410 may be configured to store information associated with each of the auditable devices of the system 100. For example, for a given auditable camera 106, the auditable device data store 410 may store information such as a unique device identifier, an identifier (such as a badge number or the like) of a user 92 associated with the auditable camera 106 at a given time or date, capabilities of the auditable camera 106, and/or the like. The video data store 412 and audio data store 414 are configured to store data captured by one or more auditable cameras 106 or other devices that can capture audio and/or video data and are enrolled with the system 100. In some embodiments, the video data store 412 and audio data store 414 are merged into a single data store, and audio and video data that are recorded contemporaneously may be stored together in a single file. The audit trail data store 416 stores records of auditable events detected by the auditable devices of the system 100, as described further below.

The evidence management system 102 also includes a data gathering engine 418 and a user interface engine 420. The data gathering engine 418 is configured to receive audit trail information, video data, audio data, and/or other recorded data from the auditable devices via the evidence collection dock 104 and the coordinator computing device 107. The user interface engine 420 is configured to generate and present user interfaces for displaying and interacting with the data collected by the evidence management system 102 via web pages, application programming interfaces, or any other suitable technology. Each of the interfaces and engines of the evidence management system 102 is configured to use a network interface 422 for communication with other components of the system 100 via the Internet. Further description of the actions taken by the components of the evidence management system 102 is provided below.

Figure 5A:
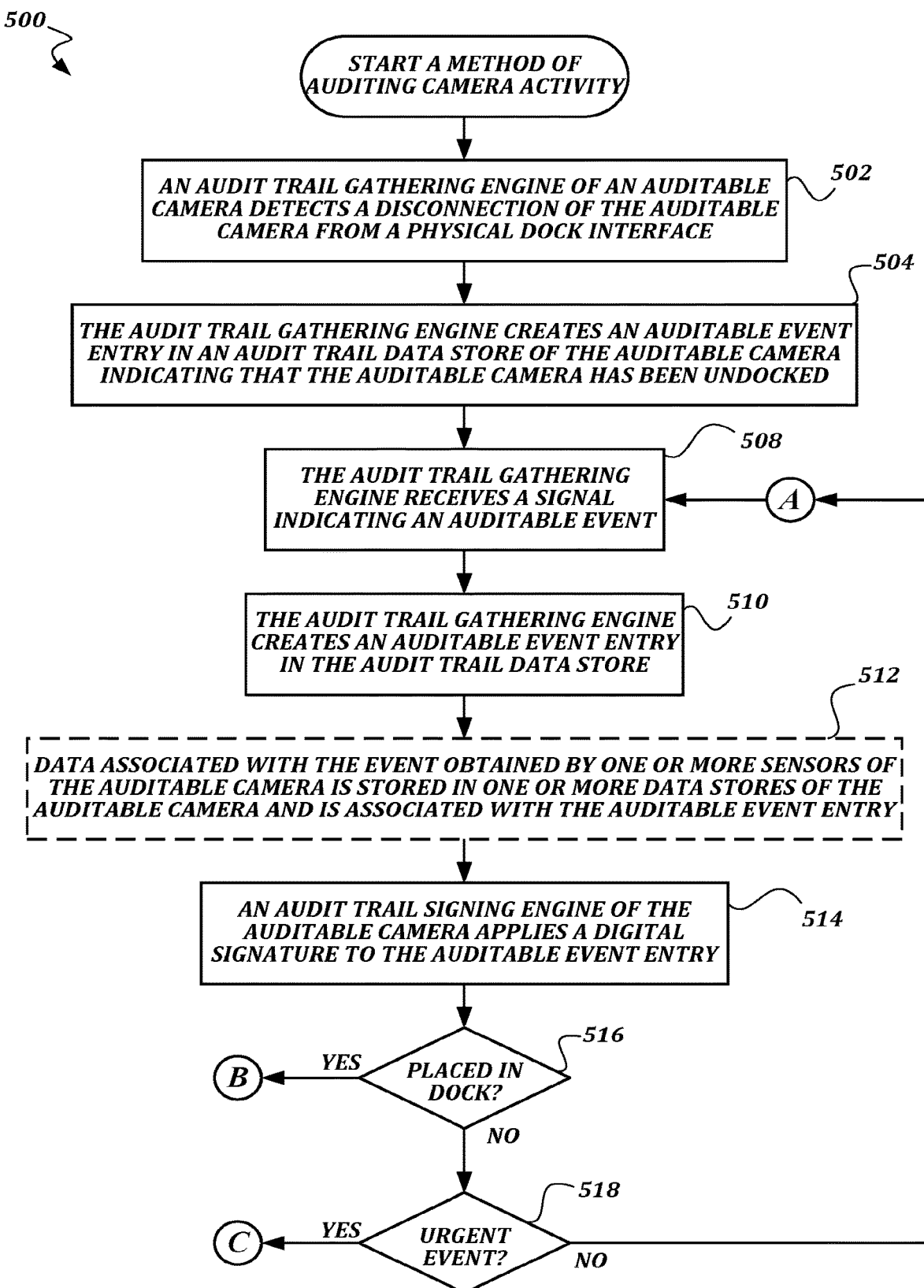
FIGS. 5A-5B are a flowchart that illustrates an exemplary embodiment of a method of auditing camera activity according to various aspects of the present disclosure.
Figure 5B:
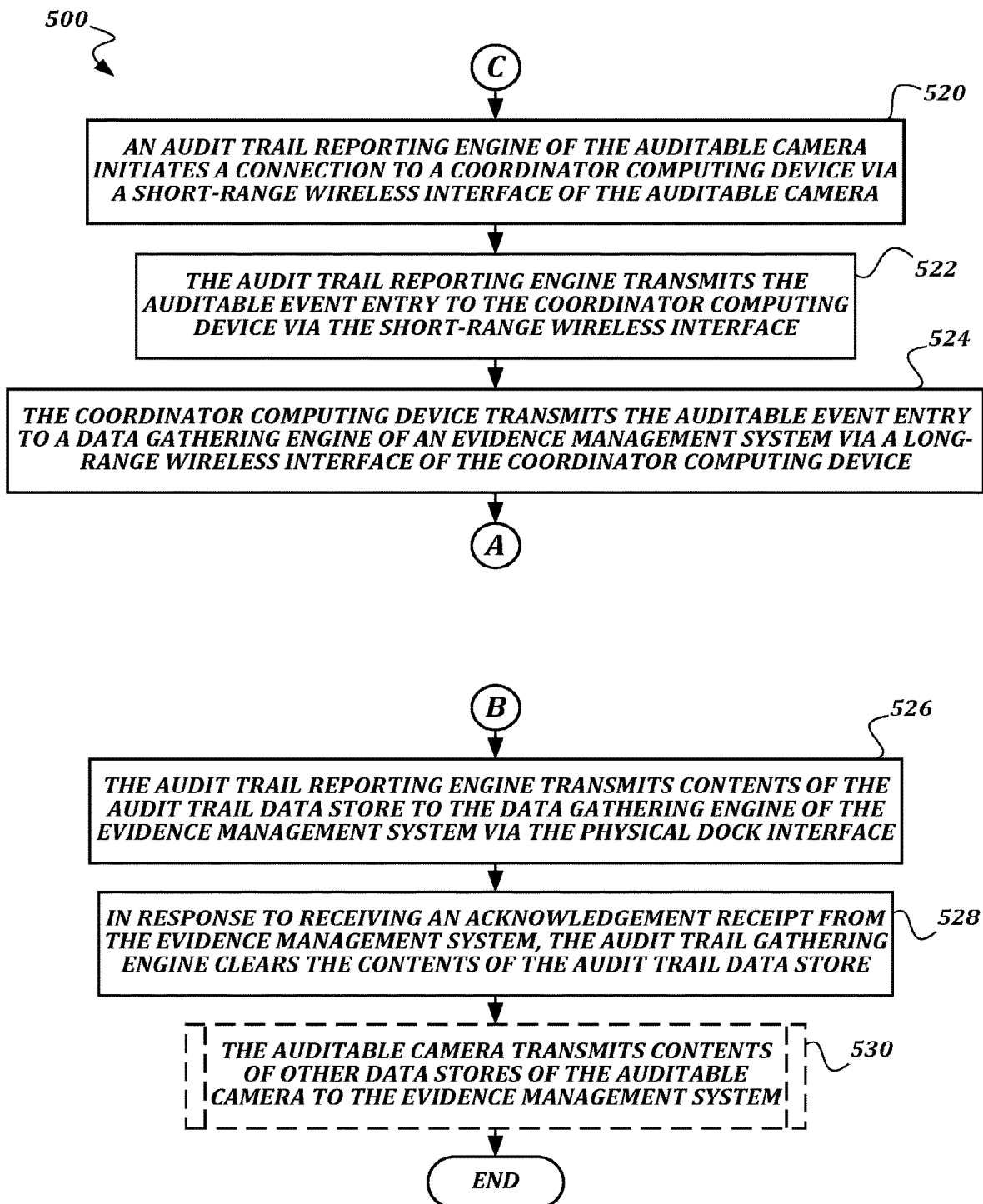

FIGS. 5A-5B are a flowchart that illustrates an exemplary embodiment of a method of auditing camera activity according to various aspects of the present disclosure. One of ordinary skill in the art will recognize that, although a method of auditing camera activity is illustrated and described, other devices that detect events (such as the auditable weapon 108, the light bar sensor 110, and/or the like) could also be audited using a similar method, though for such devices the actions relating to transfer of video and/or audio data may not be performed.

From a start block, the method 500 proceeds to block 502, where an audit trail gathering engine 214 of an auditable camera 106 detects a disconnection of the auditable camera 106 from a physical dock interface 232. In some embodiments, when the physical dock interface 232 is electrically disconnected from the evidence collection dock 104, the physical dock interface 232 transmits a signal to the audit trail gathering engine 214 to notify it of the disconnection event. Next, at block 504, the audit trail gathering engine 214 creates an auditable event entry in an audit trail data store 216 of the auditable camera 106 indicating that the auditable camera 106 has been undocked.

In some embodiments, particularly where the user 92 is a law enforcement official, the undocking auditable event entry may indicate the start of a shift and the related start of auditing activities related to that shift. In some embodiments, the audit trail data store 216 may have been emptied after the previously recorded information was transmitted to the evidence management system 102 (as described further below), so at this point, the auditable event entry indicating the start of shift may be the only auditable event entry in the audit trail data store 216.

The method 500 then proceeds to block 508, where the audit trail gathering engine 214 receives a signal indicating an auditable event. The signal may be received from another component of the auditable camera 106, such as the camera control engine 204, the battery sensor 234, a physical user interface device 208, the physical dock interface 232, or any other component. The signal may indicate any of a wide variety of auditable events. These events include, but are not limited to: a start recording event, a stop recording event, a pause recording event, a button press event, a battery or other hardware fault, a battery charge status threshold event, a storage error, a free storage threshold event, an interaction or connection status change via a wireless interface, an interaction or connection status change via the physical dock interface 232, a physical motion event, a lack-of-physical motion event (i.e., the auditable camera 106 has remained stationary for a given amount of time, an environmental event such as a change in environmental temperature or humidity past a threshold value, a geofence event, a drop event, and a debug event.

At block 510, the audit trail gathering engine 214 creates an auditable event entry in the audit trail data store 216. In some embodiments, the auditable event entry includes information that identifies the type of the event (such as a numeric event type identifier, an event type string, and/or the like), and may include further information associated with the event. As several non-limiting examples, a hardware fault auditable event entry may include a fault type and a fault code; a start recording event may include camera settings such as exposure, F-stop, frame rate, and/or the like; a battery fault event may also indicate the type of battery fault; and so on. In some embodiments, the audit trail gathering engine 214 may actively obtain other information to include in the auditable event entry that cannot be derived solely from information included in the signal. As several non-limiting examples, the audit trail gathering engine 214 may itself obtain a timestamp from the clock 230 to be included in the auditable event entry; the audit trail gathering engine 214 may use the short-range wireless interface 228 to obtain GPS information or user-entered metadata from the coordinator computing device 107 to be included in the auditable event entry; and so on.

At optional block 512, data associated with the event obtained by one or more sensors of the auditable camera 106 is stored in one or more data stores 222, 224 of the auditable camera 106 and is associated with the auditable event entry. For example, if the event is a start recording event, then data obtained by the camera control engine 204 from the video sensor 202 may be stored in the video data store 222, and/or data obtained by the camera control engine 204 from the audio sensor 206 may be stored in the audio data store 224. To associate the stored data with the auditable event entry, a unique identifier of the auditable event entry may be stored along with the video or audio data, and/or a unique identifier of the video and/or audio data may be stored in the auditable event entry. The actions described with respect to block 512 are optional because some events, like battery faults, may not be related to the recording of data to be stored in one of the data stores 222, 224. In some embodiments, the actions described with respect to block 512 occur at other times and are not limited to this point in the overall method 500. For example, data such as video and/or audio data may be recorded continuously by the auditable camera 106. The auditable event entries may then be associated with or otherwise used to identify subsets of interest within the recorded data.

At block 514, an audit trail signing engine 210 of the auditable camera 106 applies a digital signature to the auditable event entry. In some embodiments, applying the digital signature uses a cryptographic hash to guarantee that the auditable event entry has not been altered or corrupted since being signed. For example, in one non-limiting embodiment, the evidence management system 102 may assign a private key to the auditable camera 106, which is stored in the certificate data store 218 when the auditable camera 106 is connected via the physical dock interface 232. The private key is used by the audit trail signing engine 210 to create a cryptographic hash of the auditable event entry, which is then added to the auditable event entry to sign it. Subsequently, a public key made available by the evidence management system 102 may be used to verify that the auditable event entry has not been tampered with since it was signed. In some embodiments, the cryptographic hash may be stored elsewhere, such as in the certificate data store 218, and may simply be associated with the auditable event entry instead of being added to it. In some embodiments, the audit trail signing engine 210 may sign the data stored in the video data store 222 and the audio data store 224 using a similar technique. In some embodiments, the signatures generated for the video and/or audio data may be added to the auditable event entry before the auditable event entry is signed. In some embodiments, some other suitable technique for applying digital signatures that ensure that data has not been altered or corrupted is used instead of the technique described above.

In some embodiments, the actions described with respect to block 514 may be performed in response to the creation of the auditable event entry as is illustrated. In some embodiments, the actions described with respect to block 514 may instead be performed later, such as in response to a request to transmit the auditable event entry to the evidence management system 102. Waiting to apply the signature until shortly before upload may help to conserve battery life, as the signature processing for much of the information could be deferred until the auditable camera 106 is coupled to the evidence collection dock 104 and is therefore receiving power.

One will note that, if the identifier or signature of the video data and/or audio data is stored in the auditable event entry before the signature is applied to the auditable event entry, then the signatures ensure that the auditable event entry cannot be tampered with to refer to a different video and the video/audio data cannot be replaced without invalidating the signatures. Accordingly, the technical problem of how to irrefutably associate recorded videos with a lightweight log of actions performed by an auditable camera 106 despite intermittent connectivity can be overcome.

At this point in the method 500, the storage of the auditable event entry in the audit trail data store 216 is complete. In most cases, the method 500 would then loop back and wait for a subsequent auditable event, though there are two special cases where the method 500 would either perform additional processing or exit the loop instead of simply looping back. Accordingly, the method 500 proceeds to a decision block 516, where a determination is made regarding whether the auditable event indicated that the auditable camera 106 was placed in an evidence collection dock 104. As with the disconnection event described above with respect to block 502, this may be detected by an electrical connection being made via the physical dock interface 232, and a signal being provided by the physical dock interface 232 to the audit trail gathering engine 214 accordingly. If the result of the determination at decision block 516 is YES, then the method 500 proceeds to a continuation terminal ("terminal B").

From terminal B (FIG. 5B), the method 500 proceeds to block 526, where the audit trail reporting engine 212 transmits contents of the audit trail data store 216 to the data gathering engine 418 of the evidence management system 102 via the physical dock interface 232 and the evidence collection dock 104. In some embodiments, the evidence collection dock 104 may include a memory, a processor, and networking hardware that are configured to enable the evidence collection dock 104 to download the contents of the audit trail data store 216 from the auditable camera 106 and to subsequently upload the contents to the data gathering engine 418 via the network 90 using any suitable data transmission technique.

At block 528, in response to receiving an acknowledgement receipt from the evidence management system 102, the audit trail gathering engine 214 clears the contents of the audit trail data store 216. Waiting for the acknowledgement receipt ensures that the audit trail data was received by the evidence management system 102 and was stored successfully before it is cleared from the auditable camera 106. In some embodiments, the evidence management system 102 may provide one acknowledgement receipt for the entire contents of the audit trail data store 216. In some embodiments, the evidence management system 102 may provide acknowledgement receipts for subsets of the uploaded data. For example, data may be uploaded in chronological order from the audit trail data store 216, and the evidence management system 102 transmits an acknowledgement receipt for each individual piece of content. Subsequently, each piece of content would be deleted from the auditable camera 106 once its corresponding acknowledgement receipt is received. Such an embodiment would allow an upload to be interrupted and the auditable camera 106 to be reused without losing any of the data already stored on the auditable camera 106.

Figure 5C:
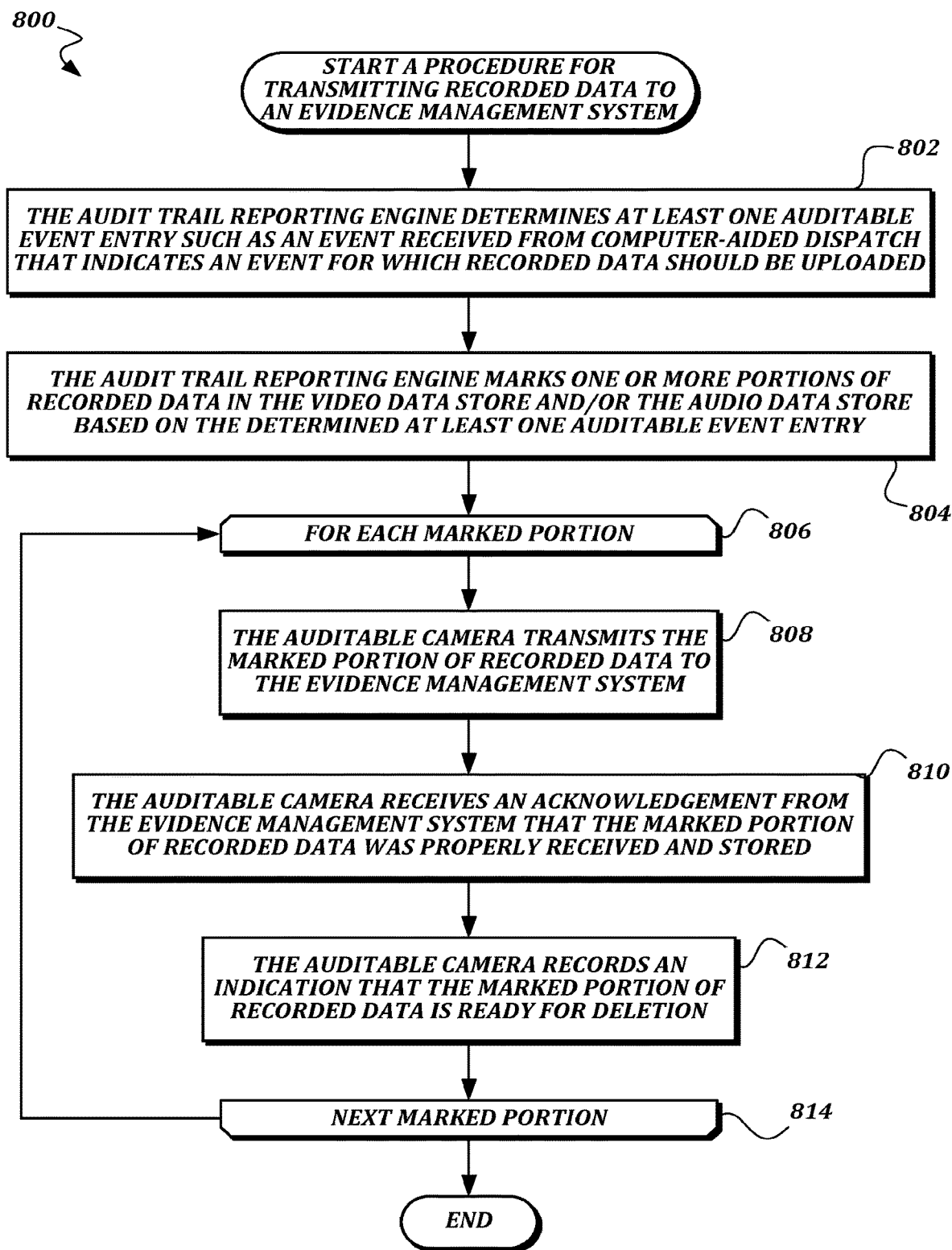
FIG. 5C is a flowchart that illustrates an exemplary embodiment of a procedure for transmitting recorded data to an evidence management system according to various aspects of the present disclosure.

At optional procedure block 530, the auditable camera 106 transmits contents of other data stores of the auditable camera 106 to the evidence management system 102. For example, the auditable camera 106 may transmit the data from the video data store 222 and/or the audio data store 224, if any, to the evidence management system 102 upon being connected to the physical dock interface 232, or via the long-range wireless interface 226. As another example, the auditable camera 106 may transmit the data to the coordinator computing device 107 via the short-range wireless interface 228, and the coordinator computing device 107 may in turn transmit the data to the evidence management system 102. In some embodiments, the procedure used at procedure block 530 comprises transmitting all of the data from the video data store 222, the audio data store 224, or any other data store of the auditable camera 106 to the evidence management system 102. In some embodiments, the procedure used at procedure block 530 may comprise causing limited subsets of the data within the video data store 222, the audio data store 224, or any other data store of the auditable camera 106 to be transmitted to the evidence management system 102. One example procedure suitable for use in procedure block 530 is illustrated in FIG. 5C and described in further detail below.

The actions associated with block 530 are described as optional, because in some embodiments, there might not be any such data, particularly if the method 500 is being used with an auditable device other than an auditable camera 106, such as an auditable weapon 108. In some embodiments, the actions of block 530 may happen before (or contemporaneously with) the actions of block 526. In some embodiments, an acknowledgement receipt may be generated by the evidence management system 102 for the video/audio data as well, and receiving the acknowledgement receipt may cause the auditable camera 106 to delete its copy of the transferred audio/video data. The method 500 then proceeds to an end block and terminates.

Returning to decision block 516 (FIG. 5A), if the result of the determination regarding whether the event indicates that the auditable camera 106 has been connected to a physical dock is NO, then the method 500 proceeds to another decision block 518, where a determination is made regarding whether the auditable event is an urgent event. An urgent event is an auditable event for which the system 100 is configured to ensure that the evidence management system 102 is made aware of as soon as possible, even before the auditable device is returned to the evidence collection dock 104. This functionality is useful to ensure that, for urgent events, the associated data is eventually uploaded to the evidence management system 102 and is not instead forgotten. One example of an urgent event may be a start recording event, and an example of a non-urgent event may be a battery fault event. If the system 100 is configured to consider a start recording event to be an urgent event, then the evidence management system 102 will be notified each time a recording is started with an auditable camera 106, even if the associated video and/or audio is not uploaded to the evidence management system 102. This information can be used in many ways, including prompting the user 92 to dock the auditable camera 106 in order to upload the missing video, providing a data trail indicating that all relevant videos for an incident or during a given time period were uploaded, and/or the like.

In some embodiments, an urgent event may be reported by the auditable camera 106 to one or more computing devices other than the evidence management system 102. In one example, the urgent event may be transmitted to a computing device associated with a supervisor of the user 92 and/or a computing device associated with another user associated with the user 92 (e.g., in an example where the user 92 is a law enforcement officer, the other user may be a partner of the user 92). Auditable events that may be considered urgent events in such an embodiment may include starting, pausing, or stopping video recording. In some embodiments, the manner in which video recording is controlled may determine whether an associated auditable event is urgent or not, and/or whether the urgent event is reported to computing devices other than the evidence management system 102 instead of or in addition to being reported to the evidence management system 102. For example, manually starting video recording by the user 92 or automatic starting of video recording in response to a signal received from a remote computing device (e.g., a dispatch computing device) may be considered urgent events to be reported to computing devices other than the evidence management system 102 due to the likelihood that other users associated with the user 92 would benefit from being immediately informed of the event.

If the result of the determination at decision block 518 is NO and the auditable event is not an urgent event, then the method 500 proceeds to a continuation terminal ("terminal A"), and from terminal A returns to block 508 upon the receipt of a subsequent signal indicating an auditable event. Otherwise, if the result of the determination at decision block 518 is YES and the auditable event is an urgent event, then the method 500 proceeds to another continuation terminal ("terminal C").

From terminal C (FIG. 5B), the method 500 proceeds to block 520, where an audit trail reporting engine 212 of the auditable camera 106 initiates a connection to a coordinator computing device 107 via a short-range wireless interface 228 of the auditable camera 106. In some embodiments, the audit trail reporting engine 212 uses the short-range wireless interface 228 to establish a wireless connection to the coordinator computing device 107. In some embodiments, the wireless connection to the coordinator computing device 107 may already be available, and the audit trail reporting engine 212 just uses the existing connection.

At block 522, the audit trail reporting engine 212 transmits the auditable event entry to the coordinator computing device 107 via the short-range wireless interface 228. Next, at block 524, the coordinator computing device 107 transmits the auditable event entry to a data gathering engine 418 of an evidence management system 102 via a long-range wireless interface 310 of the coordinator computing device 107.

In some embodiments, one or more of the actions described in blocks 520-524 may be performed when an opportunity arises to do so, if the actions cannot be performed immediately. For example, upon detecting the urgent event, the auditable camera 106 may not be within short-range wireless communication range of the coordinator computing device 107. In such a case, the audit trail reporting engine 212 may wait for a notification from the short-range wireless interface 228 that it has returned within range before proceeding. An example of this case would be if the user 92 leaves the vehicle 94, and the coordinator computing device 107 is left within the vehicle 94. The communication channel to the coordinator computing device 107 would be opened once the user 92 returned to the vehicle 94, or to a location near enough to the vehicle 94 to be within short-range wireless communication range. As another example, in some embodiments, the long-range wireless interface 310 of the coordinator computing device 107 could be 3G, 4G, LTE, or another wireless network with broad geographic coverage such that the coordinator computing device 107 would usually remain connected to the evidence management system 102. However, even with broad geographic coverage, the user 92 may take the coordinator computing device 107 through an area without wireless data coverage (such as a tunnel, a valley, a parking garage, and/or the like), or may use a long-range wireless technology with more limited connection range or geographic coverage (such as WiFi). In such limited connectivity environments, the coordinator computing device 107 may receive and store the auditable event entry from the auditable camera 106, and transmit it to the evidence management system 102 once a data connection becomes available via the long-range wireless interface 310.

In embodiments wherein urgent events are transmitted to one or more computing devices other than the evidence management system 102, the auditable camera 106 sends the auditable event entry to the one or more computing devices. In some embodiments, the auditable event entry may be sent to the one or more computing devices via the coordinator computing device 107 as discussed above with relation to sending the auditable event entry to the evidence management system 102. In some embodiments, the auditable event entry may be sent to the one or more computing devices via the evidence collection dock 104 and the network 90, via the long-range wireless interface 226 and the network 90, or via any other communication path. The signal may be in the form a text message, an application-directed SMS, an email message, a signal that causes an audible or visual alert, and/or the like.

Such urgent event reporting may be used as an alert to other users associated with the user 92. In one example, the user 92 is a responder and the auditable camera 106 is configured to send an action report to a computing device of a supervisor of the user 92 in response to the auditable camera 106 pausing video recording. This allows the supervisor to know immediately that a recording was paused and possibly investigate why the recording was paused. In this example, the auditable camera 106 may not be configured to consider starting or stopping video recording an urgent event to be transmitted to computing devices other than the evidence management system 102, as such starting or stopping video recording events may occur too frequently for the supervisor to want alerts. In another example, the user 92 is a responder and the auditable camera 106 is configured to send an auditable event entry for an urgent event to a computing device of another responder associated with the user 92 in response to an event that indicates that video recording of the auditable camera 106 is manually started, such as a button press event. Manual starting of the video recording may indicate that a situation of interest is occurring around the user 92 and action reporting in response to manual starting may be an alert to the other responder to be aware of the situation.

The method 500 then proceeds to terminal A. One of ordinary skill in the art will recognize that the actions described in blocks 520-524 are not blocking steps. Instead, the method 500 may return to terminal A upon receiving a signal indicating an auditable event (as described in block 508) even while the actions described in blocks 520-524 are being executed (or are awaiting execution).

FIG. 5C is a flowchart that illustrates an exemplary embodiment of a procedure for transmitting recorded data to an evidence management system according to various aspects of the present disclosure. The procedure 800 is an example of a procedure suitable for use in block 530 of FIG. 5B, though other procedures may also be suitable. From a start block, the procedure 800 advances to block 802, where the audit trail reporting engine 212 determines at least one auditable event entry (such as an event received from a computer-aided dispatch system 101) that indicates an event for which recorded data should be uploaded. In some embodiments, the audit trail reporting engine 212 may search the audit trail data store 216 for auditable event entries that indicate events received from the computer-aided dispatch system 101. In some embodiments, such auditable event entries may be stored by the auditable camera 106 in some data store other than the audit trail data store 216.

In some embodiments, the auditable camera 106 may have been recording video data, audio data, or other data to be transmitted to the evidence management system 102 while the auditable event entries that indicate events for which recorded data should be uploaded were created. For example, the auditable camera 106 may be continuously recording video data and/or audio data when the long-range wireless interface 226 receives event information transmitted by the computer-aided dispatch system 101 and causes corresponding auditable event entries to be created. As another example, the auditable camera 106 may be continuously recording video data and/or audio data when a button press is detected, a short-range wireless signal is received, or some other action occurs that causes an auditable event entry to be created that indicates an event for which recorded data should be uploaded.

In some embodiments, the auditable camera 106 may have completed its recording of video data and/or audio data, and may receive event information after the fact that indicates that one or more events occurred while the video data and/or audio data was being recorded. For example, the auditable camera 106 may receive event information from the computer-aided dispatch system 101 when it is connected to the evidence collection dock 104 in order to upload the recorded data to the evidence management system 102. As another example, the auditable camera 106 may receive event information from a coordinator computing device 107 that is entered by a user 92 after the fact. In such an example, the auditable camera 106 may be recording data continuously, and after an event occurs the user 92 may enter information into the coordinator computing device 107 indicating the time of the event.

While the above examples describe receiving information from the computer-aided dispatch system 101, it is to be noted that in some embodiments the information may be received directly by the auditable camera 106 from the computer-aided dispatch system 101 via a long-range wireless connection (or via the evidence collection dock 104), while in other embodiments the information may be transmitted from the computer-aided dispatch system 101 to the evidence management system 102 and/or the coordinator computing device 107, and then from the evidence management system 102 and/or the coordinator computing device 107 to the auditable camera 106. It is also to be noted that while receiving information from a computer-aided dispatch system 101 is described, some embodiments may receive event information from another source, such as a records management system 404, in ways similar to those described above for computer-aided dispatch information.

At block 804, the audit trail reporting engine 212 marks one or more portions of recorded data in the video data store 222 and/or the audio data store 224 based on the determined at least one auditable event entry. In some embodiments, a single auditable event entry may indicate both a start time for an event and an end time for an event. In some embodiments, a first auditable event entry may indicate a start time for an event, and a second auditable event entry may indicate an end time for the event. In some embodiments, the audit trail reporting engine 212 may mark a portion of the recorded data that lies between the start time for the event and the end time for the event indicated by one or more auditable event entries. In some embodiments, the audit trail reporting engine 212 may mark a portion of the recorded data that lies outside of the start time for the event and/or the end time for the event as indicated by one or more auditable event entries. For example, the audit trail reporting engine 212 may be configured to create a pre-event buffer by marking a start of the event in the recorded data as occurring a predetermined amount of time (such as thirty seconds) before the event start time indicated by the auditable event entry. As another example, the audit trail reporting engine 212 may be configured to create a post-event buffer by marking an end of the event in the recorded data as occurring a predetermined amount of time (such as thirty seconds) after the event end time indicated by the auditable event entry. In some embodiments, the audit trail reporting engine 212 may be configured to create a pre- or post-event buffer for a first set of recorded data (such as video data), but to not create a pre- or post-event buffer for a second set of recorded data (such as audio data).

As understood by one of ordinary skill in the art, "marking" the portion of recorded data may be performed using any suitable technique, including but not limited to creating records indicating marked portions of recorded data in a data structure separate from the recorded data; creating records within metadata associated with the recorded data; setting a flag or other indicator in metadata associated with portions of the recorded data; and/or any other suitable technique.

The procedure 800 then advances to a for loop defined between a for loop start block 806 and a for loop end block 814, wherein each marked portion of the recorded data is processed. From the for loop start block 806, the procedure 530 advances to block 808, where the auditable camera 106 transmits the marked portion of recorded data to the evidence management system 102. As discussed above, the transmission may take place via the physical dock interface 232, the short-range wireless interface 228, or the long-range wireless interface 226. In some embodiments, the auditable camera 106 may transmit the marked portion of recorded data, and may refrain from transmitting portions of the recorded data that are not marked. One advantage of such embodiments is that the time and computing power required for processing the unmarked portions of data for transfer will not be wasted. In some embodiments, the auditable camera 106 may transmit all of the recorded data, and the evidence management system 102 may compare the recorded data to the event markings (or information received by the evidence management system 102 directly from a computer-aided dispatch system 402 or records management system 404) in order to determine portions of the recorded data to be saved in a video data store 412, an audio data store 414, or some other data store. One advantage of such embodiments is that all recorded data will at some point be transmitted to the evidence management system 102. In either type of embodiment, the evidence management system 102 can correlate the marked portions of recorded data with event information obtained from the computer-aided dispatch system 402 or records management system 404.

Next, at block 810, the auditable camera 106 receives an acknowledgement from the evidence management system 102 that the marked portion of recorded data was properly received and stored. In some embodiments, the evidence management system 102 may compute a hash or other value based on the received recorded data, and transmits the value to the auditable camera 106 as part of the acknowledgement. The auditable camera 106 can then compute the hash or other value based on its own copy of the recorded data to determine whether the recorded data was successfully received by the evidence management system 102 without errors. The acknowledgement can be received by the auditable camera 106 from the evidence management system 102 via any suitable communication path, such as the communication paths discussed above that are used to transmit the recorded information from the auditable camera 106 to the evidence management system 102.

At block 812, the auditable camera 106 records an indication that the marked portion of recorded data is ready for deletion. In some embodiments, the auditable camera 106 may delete the marked portion of recorded data at this point. In some embodiments, the auditable camera 106 may store the indication that the marked portion of recorded data is ready for deletion, and then later delete all of the recorded data at once upon determining that ready for deletion indications have been stored for all of the marked portions of recorded data.

The procedure 530 then advances to the for loop end block 814. If further marked portions of recorded data remain to be processed, the procedure 530 returns to the for loop start block 806 and processes the next marked portion of recorded data. Otherwise, the procedure 530 advances from the for loop end block 814 to an end block, where it terminates.

Figure 6:
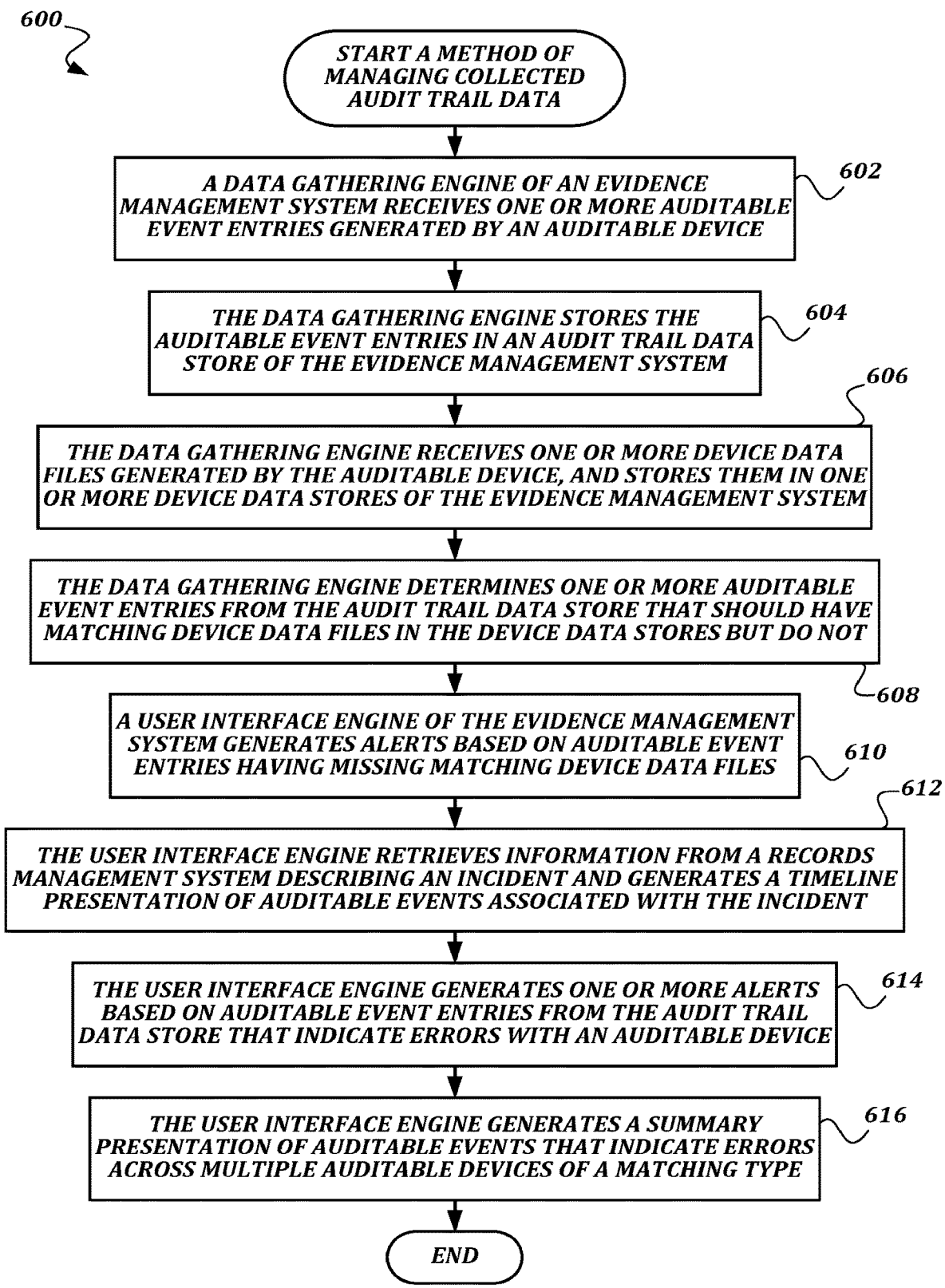
FIG. 6 is a flowchart that illustrates an exemplary embodiment of a method of managing collected audit trail data according to various aspects of the present disclosure.

FIG. 6 is a flowchart that illustrates an exemplary embodiment of a method of managing collected audit trail data according to various aspects of the present disclosure. From a start block, the method 600 proceeds to block 602, where a data gathering engine 418 of an evidence management system 102 receives one or more auditable event entries generated by an auditable device such as an auditable camera 106, an auditable weapon 108, and/or the like. The auditable event entries may be received via the evidence collection dock 104 as described in blocks 526-530 of the method 500, or could be received via the coordinator computing device 107 as described in blocks 520-524 of the method 500.

At block 604, the data gathering engine 418 stores the auditable event entries in an audit trail data store 416 of the evidence management system 102. At block 606, the data gathering engine 418 receives one or more device data files generated by the auditable device, and stores them in one or more device data stores of the evidence management system 102. For example, video data may be stored in a video data store 412, and audio data may be stored in an audio data store 414. In some embodiments, the video data and audio data may be stored in the same data store. In some embodiments, data in the video data store 412 and in the audio data store 414 may be stored separately, but may include links or other associations to each other so that may be treated as a single unit. The device data files may be received using actions such as those described in block 530 of the method 500.

At block 608, the data gathering engine 418 determines one or more auditable event entries from the audit trail data store 416 that should have matching device data files in the device data stores but do not. For example, an urgent event may have been received and stored in the audit trail data store 416 indicating a start recording event, but no video file associated with the event is found in the video data store 222. This determination can help find situations where vital evidence is missing but could still be uploaded. This determination can also provide proof that all existing videos associated with an auditable camera 106 are present within the evidence management system 102. At block 610, a user interface engine 420 of the evidence management system 102 generates alerts based on auditable event entries having missing matching device data files. These auditable event entries are those found in the block 606. In some embodiments, the alerts may include email or text message upload reminders sent to the user 92 associated with the appropriate auditable device, or to the user's supervisor. In some embodiments, the alerts may include a report presented as a web page (or in another format) of all missing device data files for a group of devices or for a period of time.

At block 612, the user interface engine 420 retrieves information from a records management system 404 describing an incident and generates a timeline presentation of auditable events associated with the incident. The information about the incident may include, but is not limited to: a start time and an end time of the incident; one or more geographic locations associated with the incident; one or more users 92 associated with the incident; and one or more auditable devices associated with said users 92. The information about the incident may be used to find relevant auditable event entries in the audit trail data store 416. The user interface engine 420 queries the audit trail data store 416 to find the relevant auditable event entries, and places indications of the auditable events on the timeline. In the timeline presentation, interacting with an auditable event indication or a portion of the timeline (such as clicking or tapping on the indication or a portion of the timeline) may cause data associated with the auditable event, such as event detail information, and/or associated data stored in the video data store 412 and/or the audio data store 414 to be presented.

At block 614, the user interface engine 420 generates one or more alerts based on auditable event entries from the audit trail data store 416 that indicate errors with an auditable device. In some embodiments, the alerts could be an email or SMS message transmitted to the user 92 associated with the auditable device. In some embodiments, the alerts could be displayed in a summary list of errors from all devices managed by a given technical support professional or a given agency. In some embodiments, the auditable device data store 410 may be queried to determine a location or contact information of the associated user 92 in order to deliver the alert.

At block 616, the user interface engine 420 generates a summary presentation of auditable events that indicate errors across multiple auditable devices of a matching type. For example, a summary presentation may present all battery faults for all auditable cameras, regardless of user. This summary presentation may be presented to information technology management at the agency operating the auditable devices, or may be aggregated for multiple agencies and viewed by the proprietor of the evidence management system 102 and/or the developer of the auditable devices to improve engineering processes or to update future versions of the auditable devices.

The method 600 then proceeds to an end block and terminates. One of ordinary skill in the art will recognize that the steps of method 600 are presented as ordered for sake of discussion only. In some embodiments, the steps may be performed in any order, repeatedly, in parallel, and/or the like. Though it is clear that the data gathering steps would happen at some point before the presentation steps happen for the first time, it is still possible that the presentation steps could happen multiple times for a single execution of the data gathering step, or that the data gathering steps could happen without the presentation steps occurring.

Figure 7:
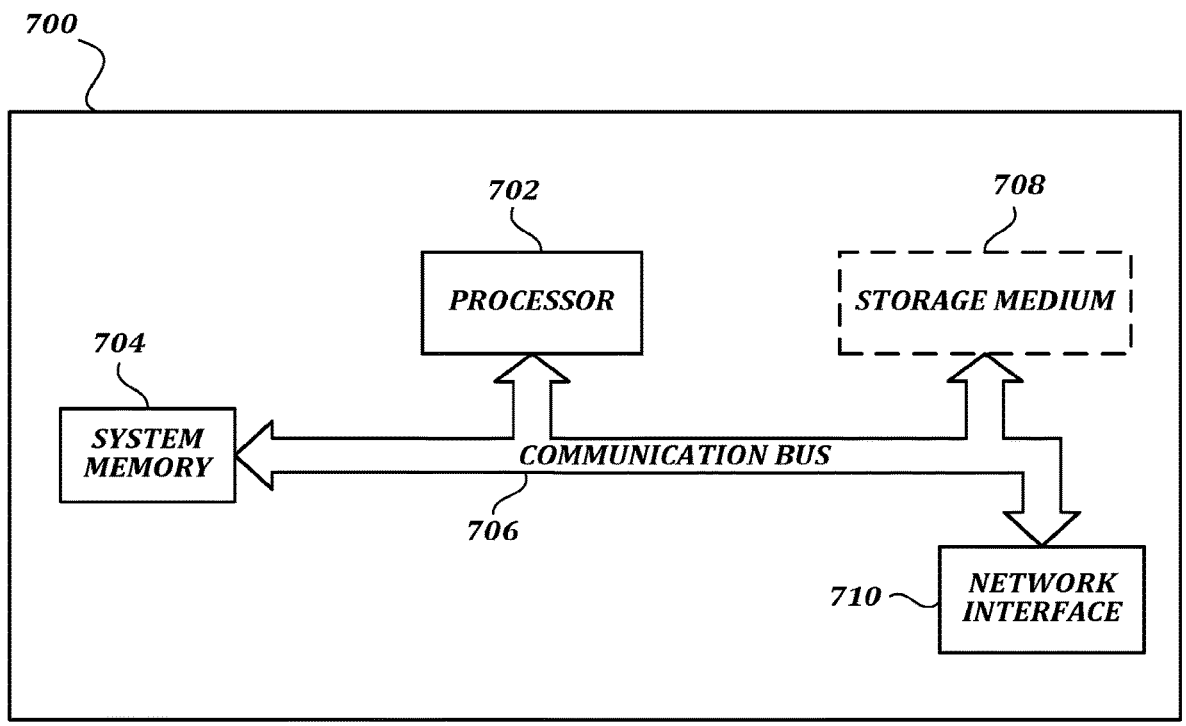
FIG. 7 is a block diagram that illustrates aspects of an exemplary computing device 700 appropriate for use as a computing device of the present disclosure.

FIG. 7 is a block diagram that illustrates aspects of an exemplary computing device 700 appropriate for use as a computing device of the present disclosure. While multiple different types of computing devices were discussed above, the exemplary computing device 700 describes various elements that are common to many different types of computing devices. While FIG. 7 is described with reference to a computing device that is implemented as a device on a network, the description below is applicable to servers, personal computers, mobile phones, smart phones, tablet computers, embedded computing devices, and other devices that may be used to implement portions of embodiments of the present disclosure. Moreover, those of ordinary skill in the art and others will recognize that the computing device 700 may be any one of any number of currently available or yet to be developed devices.

In its most basic configuration, the computing device 700 includes at least one processor 702 and a system memory 704 connected by a communication bus 706. Depending on the exact configuration and type of device, the system memory 704 may be volatile or nonvolatile memory, such as read only memory ("ROM"), random access memory ("RAM"), EEPROM, flash memory, or similar memory technology. Those of ordinary skill in the art and others will recognize that system memory 704 typically stores data and/or program modules that are immediately accessible to and/or currently being operated on by the processor 702. In this regard, the processor 702 may serve as a computational center of the computing device 700 by supporting the execution of instructions.

As further illustrated in FIG. 7, the computing device 700 may include a network interface 710 comprising one or more components for communicating with other devices over a network. Embodiments of the present disclosure may access basic services that utilize the network interface 710 to perform communications using common network protocols. The network interface 710 may also include a wireless network interface configured to communicate via one or more wireless communication protocols, such as WiFi, 2G, 3G, LTE, WiMAX, Bluetooth, Bluetooth low energy, and/or the like. As will be appreciated by one of ordinary skill in the art, the network interface 710 illustrated in FIG. 7 may represent one or more wireless interfaces or physical communication interfaces described and illustrated above with respect to particular components of the system 100.

In the exemplary embodiment depicted in FIG. 7, the computing device 700 also includes a storage medium 708. However, services may be accessed using a computing device that does not include means for persisting data to a local storage medium. Therefore, the storage medium 708 depicted in FIG. 7 is represented with a dashed line to indicate that the storage medium 708 is optional. In any event, the storage medium 708 may be volatile or nonvolatile, removable or nonremovable, implemented using any technology capable of storing information such as, but not limited to, a hard drive, solid state drive, CD ROM, DVD, or other disk storage, magnetic cassettes, magnetic tape, magnetic disk storage, and/or the like.

As used herein, the term "computer-readable medium" includes volatile and non-volatile and removable and non-removable media implemented in any method or technology capable of storing information, such as computer readable instructions, data structures, program modules, or other data. In this regard, the system memory 704 and storage medium 708 depicted in FIG. 7 are merely examples of computer-readable media.

Suitable implementations of computing devices that include a processor 702, system memory 704, communication bus 706, storage medium 708, and network interface 710 are known and commercially available. For ease of illustration and because it is not important for an understanding of the claimed subject matter, FIG. 7 does not show some of the typical components of many computing devices. In this regard, the computing device 700 may include input devices, such as a keyboard, keypad, mouse, microphone, touch input device, touch screen, tablet, and/or the like. Such input devices may be coupled to the computing device 700 by wired or wireless connections including RF, infrared, serial, parallel, Bluetooth, Bluetooth low energy, USB, or other suitable connections protocols using wireless or physical connections. Similarly, the computing device 700 may also include output devices such as a display, speakers, printer, etc. Since these devices are well known in the art, they are not illustrated or described further herein.

While illustrative embodiments have been illustrated and described, it will be appreciated that various changes can be made therein without departing from the spirit and scope of the invention.

What is claimed is:

1. A system comprising:
an evidence management system comprising:
a first audit trail data store;
a first video data store; and
a user interface engine configured to generate and present user interfaces for displaying and interacting with data collected by the evidence management system; and
an auditable camera associated with a user, the auditable camera comprising:
a video sensor;
a second audit trail data store;
a second video data store;
an audit trail gathering engine configured to receive reports of auditable events from other components of the auditable camera and to record auditable event records that represent the auditable events in the second audit trail data store; and
a network interface configured to communicate with the evidence management system via at least one network, wherein the auditable camera is configured to perform actions for processing recorded data for storage, the actions comprising:
capturing video data via the video sensor;
storing the video data within the second video data store;
receiving a signal indicating an auditable event;
responsive to receiving the signal indicating the auditable event, creating an auditable event entry in the second audit trail data store, the auditable event entry comprising information associated with the auditable event;
marking at least one subset of the video data based on the auditable event indicated by the signal;
transmitting the auditable event entry via the network interface to the evidence management system; and
uploading the at least one subset of the video data to the evidence management system, wherein:
the evidence management system stores the auditable event entry in the first audit trail data store;
the evidence management system stores the at least one subset of the video data in the first video data store;
the user interfaces comprise a timeline presentation of auditable events associated with an incident;
the auditable events comprise the auditable event; and
the timeline presentation comprises the at least one subset of the video data.

2. The system of claim 1, wherein the timeline presentation comprises information about the incident, and the information about the incident comprises a start time and an end time of the incident.

3. The system of claim 1, wherein the user interface engine is further configured to receive an interaction with a portion of the timeline presentation, and in response to the interaction, cause data associated with the auditable event to be presented.

4. The system of claim 3, wherein the data associated with the auditable event comprises the at least one subset of the video data stored in the first video data store.

5. The system of claim 1, wherein the user interface engine is further configured to receive an interaction with an indication of the auditable event in the timeline presentation, and wherein the interaction causes data associated with the auditable event to be presented.

6. The system of claim 5, wherein the data associated with the auditable event comprises event detail information.

7. The system of claim 5, wherein the data associated with the auditable event comprises the at least one subset of the video data stored in the first video data store.

8. The system of claim 1, wherein the timeline presentation comprises information about the incident, and the information about the incident comprises one or more geographic locations associated with the incident.

9. The system of claim 1, wherein the timeline presentation comprises information about the incident, and the information about the incident comprises one or more users associated with the incident and one or more auditable devices associated with the one or more users.

10. The system of claim 1, wherein the system comprises another, second auditable device associated with the user, the second auditable device is separate from the auditable camera, and the auditable event entry includes data received by the auditable camera directly from the second auditable device.

11. The system of claim 10, wherein the second auditable device comprises an auditable weapon.

12. The system of claim 10, wherein the data received directly from the second auditable device is received by the auditable camera using a short-range wireless communication technology.

13. The system of claim 1, wherein the information includes a timestamp gathered by the audit trail gathering engine.

14. The system of claim 1, wherein the information associated with the auditable event comprises a unique identifier of the at least one subset of the video data.

15. The system of claim 1, wherein the network interface comprises a long-range wireless interface and transmitting the auditable event entry comprises transmitting the auditable event entry via the long-range wireless interface.

16. A method comprising:
capturing video data via a video sensor of an auditable camera;
storing the video data within a first video data store of the auditable camera;
receiving, by the auditable camera, a signal indicating an auditable event;
responsive to receiving the signal indicating the auditable event, creating, by the auditable camera, an auditable event entry in a first audit trail data store of the auditable camera, the auditable event entry comprising information associated with the auditable event;
marking, by the auditable camera, at least one subset of the video data based on the auditable event indicated by the signal;
transmitting, by the auditable camera, the auditable event entry via a network interface of the auditable camera;
uploading, by the auditable camera, the at least one subset of the video data;
receiving, by an evidence management system, the auditable event entry;
receiving, by the evidence management system, the at least one subset of the video data;
storing, by the evidence management system, the auditable event entry in a second audit trail data store of the evidence management system;
storing, by the evidence management system, the at least one subset of the video data in a second video data store of the evidence management system;
querying, by a user interface engine of the evidence management system, the second audit trail data store to find auditable events associated with an incident;
generating, by the user interface engine of the evidence management system, a user interface comprising the auditable events associated with the incident; and
presenting, by the user interface engine of the evidence management system, the user interface for displaying and interacting with data collected by the evidence management system, wherein:
the user interface comprises a timeline presentation;
the timeline presentation comprises an indication of the auditable event placed on a timeline; and
the timeline presentation comprises the at least one subset of the video data.

17. The method of claim 16, further comprising:
retrieving, by the user interface engine of the evidence management system, information describing the incident from a records management system, wherein the second audit trail data store is queried to find the auditable events associated with the incident using the information describing the incident from the records management system.

18. The method of claim 16, further comprising:
receiving, by the user interface engine of the evidence management system, an interaction with the indication of the auditable event placed on the timeline; and
in response to the interaction, presenting the at least one subset of the video data stored in the second video data store of the evidence management system.

19. The method of claim 18, further comprising:
in response to the interaction, presenting event detail information.

20. The method of claim 19, wherein the timeline presentation comprises information about the incident, and the information about the incident comprises one or more geographic locations associated with the incident.

* * * * *